United States Patent [19]
Neuhaus

[11] 3,801,786
[45] Apr. 2, 1974

[54] METHOD AND APPARATUS FOR INSPECTING TIRES

[75] Inventor: Theodore G. Neuhaus, Bay Village, Ohio

[73] Assignee: Picker Corporation, Cleveland, Ohio

[22] Filed: Oct. 27, 1972

[21] Appl. No.: 301,529

Related U.S. Application Data

[63] Continuation-in-part of Ser. No. 186,985, Oct. 6, 1971, abandoned.

[52] U.S. Cl. .............................. 250/360, 250/453
[51] Int. Cl. ........................................ G03b 41/16
[58] Field of Search......... 250/51, 52, 65 R, 83.3 D; 73/146

[56] References Cited
UNITED STATES PATENTS

| | | | |
|---|---|---|---|
| 2,301,251 | 11/1942 | Capen | 250/52 |
| 3,550,443 | 12/1970 | Sherkin | 73/146 |
| 3,621,246 | 11/1971 | Horsey et al. | 250/52 |
| 3,621,247 | 11/1971 | Lide | 250/52 |

*Primary Examiner*—William F. Lindquist
*Attorney, Agent, or Firm*—Watts, Hoffmann, Fisher & Heinke

[57] ABSTRACT

A system for inspecting tires is disclosed in which a tire being inspected is inflated with pressurized gas and a rotating beam x-ray source is moved into the tire between the bead rims for directing x-rays through the wall of the inflated tire from rim to rim. An imaging system produces televised transparency images of the tire wall and means are provided for rotating the tire during inspection so that the tire wall is completely inspected.

48 Claims, 7 Drawing Figures

INVENTOR.
THEODORE G. NEUHAUS
BY Watts, Hoffmann, Fisher & Heinke
ATTORNEYS.

METHOD AND APPARATUS FOR INSPECTING TIRES

CROSS REFERENCED APPLICATIONS

This application is a continuation-in-part of U.S. Pat. Ser. No. 186,985 filed Oct. 6, 1971 in the name of Theodore G. Neuhaus, now abandoned.

U.S. Pat. application Ser. No. 95,859, filed Dec. 7, 1970, entitled TIRE INSPECTION APPARATUS by Anthony Palermo.

BACKGROUND OF THE INVENTION

1. Field of the Invention

The present invention relates to tire inspection systems and more particularly relates to tire inspection systems producing x-ray transparency images of tire walls.

Conventional cured tires are composed in part of rubber or a rubber-like material and are defined by axially spaced side wall portions including rims and a tread portion extending between the side walls. The side walls and tread portion extend circumferentially about an axial tire centerline. Fabric plies are molded into the tire body and extend through the tire from rim to rim. A stranded metal cable extends circumferentially within each rim to reinforce the rim. The tire rims are frequently referred to as bead rims. In some tires, belts extend circumferentially about the tire with the tread portion. The belts, plies and bead rims of tires can have flaws which may adversely effect the performance and durability of the tire and accordingly it is desirable to inspect these various internal elements of the tires, at least from time to time during production runs of the tires, by the use of inspection systems employing tire penetrating radiation, such as x-rays, to assure uniform quality tires.

THE PRIOR ART

X-ray tire inspection systems in which a tire is supported for rotation during inspection have taken several forms. According to some prior art proposals, tires being inspected have been supported by rotatable drive members which grip the external side walls or tread area of the tire and are driven to rotate the tire about its axis during the inspection. In other systems the tires have been supported by drive shafts which extend through the hub of the tire and which include members which engage and spread the bead rims apart as the tire is rotated. These systems generally were operated so that the tires rotated quite slowly during the inspection since the tires tended to walk off of the supports even at moderate rotational speeds.

Apparatus which has functioned to spread the tire rims apart has facilitated imaging the tread area of the tires; however, the side walls of the tires have sometimes been distorted during the inspection. Side wall distortions have tended, in some circumstances, to damage the tires and have also resulted in distorted x-ray images of the side walls. Transparency images of the distorted side walls has tended to reduce the reliability of the inspection information.

The use of shafts which extend through the hubs of the tires has complicated the procedures by which the tires are moved into and from inspection stations. Furthermore, the projecting shafts have at times interferred with x-ray tubes which were positioned in the hub area of the tires during inspection. This was particularly true when relatively small diameter tires were being inspected.

Instability of tires being inspected has adversely effected the reliability of x-ray inspection techniques. With the advent of radial ply or "rag wall" tires, some of the prior art inspection systems, particularly systems employing rim spreading shafts extending through the tire hub, have not been effective because the structure of the side walls of such tires is not sufficiently strong to stabilize the tire on the apparatus during rotation. That is to say, these side walls flex significantly under the weight of the tire itself and the tire bodies wobble when rotated in the apparatus. Uncured "green" tires often exhibit similar instability during inspection.

The cross referenced patent application discloses a system for x-ray imaging tire walls by the use of a rotating beam of x-rays emanating from within the torus defined by the tire. This system enabled relatively quick and simple rim to rim tire inspection. While the new rotatable beam inspection concept greatly facilitated quick and complete tire inspection, the tire bead rims were still required to be spread apart in many instances. Further, the problems of interference between the x-ray tube or its supporting structure and shafts extending through the tire hub, and long overall inspection cycle times were not alleviated.

SUMMARY OF THE INVENTION

The present invention provides a system for inspecting tires wherein the tire is stabilized and/or the tire bead rims are separated without distortion by inflating the tire during inspection, wherein bead to bead inspection of the tires is accomplished without requiring repositioning of the tire, and which enables tires to move through the apparatus without encountering obstacles such as fixtures or portions of the apparatus which have to be moved during on and off loading of the tires. The new system is also effective to provide for improved imaging of tires having highly flexible side walls and/or relatively small bead rim diameters. In addition, the new system provides unexpectedly improved x-ray transparency images of the tires being inspected.

According to a preferred construction of the present invention, tires being inspected are fed along a path of travel to an inspection station defined by tire inspecting apparatus. When a tire reaches the inspection station, tire engaging members on opposite sides of the path of travel move into sealing engagement with the bead rims of the tire to produce an air tight volume within the tire and between the tire engaging members.

A source of tire penetrating radiation is disposed within or adjacent the toroidal volume defined by the tire for directing the radiation through an adjacent circumferential section of the tire from bead rim to bead rim. In the illustrated and preferred embodiment, one of the tire engaging members carries a rotating beam x-ray source including an x-ray tube located between the respective tire engaging members. When a tire is engaged and supported by the members the x-ray source is moved radially to a position at which at least the anode of the x-ray tube is positioned in the torus of the tire. Movement of the x-ray source to the inspection position is carried out simultaneously with or immediately after the inflation of the tire. The pressure in the tire is effective to spread the bead rims sufficiently to enable clearance between the rims and the x-ray source without distortion of the side walls or bead rims.

The tire is then rotated about its axis and the x-ray beam is rotated so that the beam sweeps through the tire wall from bead rim to bead rim thus enabling complete inspection of the tire.

An imaging system or mechanism is provide for converting the penetrative radiation passing through the tire wall into tire wall transparency images of the complete tire from bead rim to bead rim. In one preferred embodiment of the invention the imaging system is supported at the inspection station for orbital movement about the x-ray source to enable imaging of the tire walls. The imaging system preferably includes a light intensifier arrangement optically coupled to a closed circuit television system. The television system includes a T.V. monitor located in a shielded operator's booth remote from the inspection station on which the x-ray transparency image of the tire wall is displayed.

The use of retractable tire engaging and supporting members enables in-line gravity feeding of tires to the inspection station along a chute or runway if desired. On and off loading of the tires is greatly simplified and spread because there are no supporting shafts or spindles which project through the path of travel and which would otherwise have to be moved from the path of travel when tires are placed on or removed from the apparatus. The absence of support shafts also enables easy inspection of tires having relatively small rim diameters since the clutter of apparatus in the rims is reduced.

The inspection procedure itself is shortened by the use of the new system since the tire rims are rapidly expanded and positioning of the x-ray source is quickly accomplished. Furthermore, the inflation of the tire enables faster tire rotation during inspection and enhances tire stability during inspection. This is of particular importance when green tires, "rag" wall radial and/or belted tires are inspected. Moreover, the bead rims of the tires are not distorted by the use of the new apparatus.

In an experimentally operated system the x-ray transparency image has been of unexpectedly high quality. This is thought to result at least in part from the relatively dense atmosphere in the tire which may absorb scatter radiation; i.e., "soft" reflected rays which might otherwise impinge on the light intensifier unit and reduce the definition of the television image. Furthermore, the experimental system has shown that the cyclic variations in air pressure to which the x-ray tube is exposed does not adversely effect functioning or durability of the tube.

The new system can be used to inspect tires having various sized hubs. This is accomplished, in the disclosed form of the invention, by the provision of removable annular rim adapters carried on the tire engaging members. The adapters are easily mounted on and removed from the tire engaging members.

A principal object of the present invention is the provision of a new and improved method and apparatus for inspecting tires wherein a tire being inspected is inflated to spread the bead rims apart, wherein tire handling during inspection is simplified and which provides rapid rim to rim x-ray inspection of the tire walls and high quality x-ray transparency images.

Another object of the invention is the provision of a new and improved method and apparatus for inspecting tires wherein the tire is supported at an inspection station by support members imaging opposite axial sides of the tire, fluid under pressure is introduced into volume defined by the support members and the tire to inflate the tire, tire penetrating radiation is directed through the tire wall between a radiation emitting structure and a radiation detecting structure, one of which is disposed in the volume, and the tire and the emitting and detecting structures are relatively rotated generally about the axis of the tire so that the tire is circumferentially inspected.

Other objects and advantages of the invention will become apparent from the following detailed description made with reference to the accompanying drawings which form a part of the specification.

DESCRIPTION OF PREFERRED EMBODIMENTS

Figure 1:
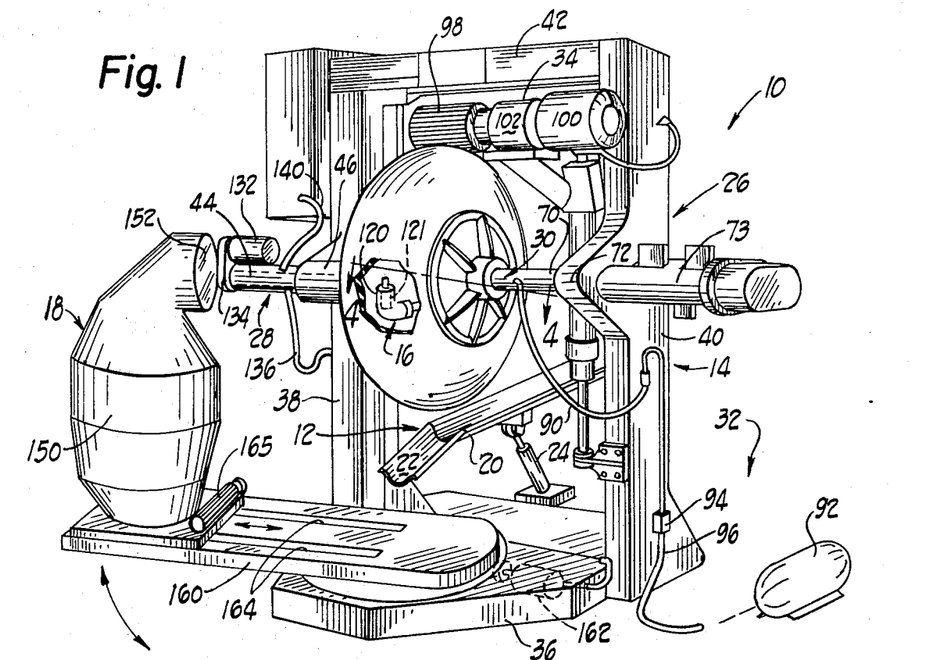
FIG. 1 is a perspective view of a tire inspection system embodying the present invention.

One preferred system 10 for inspecting tires according to the invention is illustrated in FIG. 1. The system 10 comprises a chute 12 establishing a path of travel along which tires are fed to a tire supporting assembly 14. The tire supporting assembly 14 defines an inspection station at which an x-ray source assembly 16 and an x-ray imaging system 18 are disposed.

The chute 12 includes an inclined section 20 leading into the tire supporting assembly 14 and an outlet chute section 22 along which tires are directed from the assembly 14 after inspection. The sections 20, 22 are supported by a suitable actuator 24 which controls the elevation of the sections 20, 22 and thereby controls the elevation of the axis of rotation of the tire as it rolls along the chute by the force of gravity and overhead hoists need not be employed to advance the tires to the inspection station. When a tire is supported by the assembly 14 the chute 12 is lowered by retraction of the actuator 24 as is shown in FIG. 1. Tires upstream from the assembly 14 are prevented from moving down the chute during inspection by a suitable mechanism which is not shown. After inspection the tire is released from the assembly 14 and exits from the inspection station on the outlet chute section 22.

THE TIRE SUPPORTING ASSEMBLY

The tire supporting assembly 14 defines the inspection station and comprises a support frame generally designated 26, first and second tire engaging and supporting members 28, 30, a tire inflating system, generally designated at 32 and a tire driving device 34 which is effective to rotate a tire about its axis when supported by the first and second tire support members. When a tire is located at the inspection station the tire supporting members are moved into sealing engagement with the opposite tire bead rims. The tire inflating system is then operated to introduce pressurized air into the tire for inflating the tire. The inflated tire is thus supported by the members 28, 30 and is rotated about its axis by the device 34 during the inspection.

The support frame 26 is disposed about the path of travel of the tire so that the tire is fed along the chute to the supporting assembly without interference with the support frame. The frame 26 comprises a base 36 and verticals 38, 40 which are disposed on opposite sides of the path of travel. The upper ends of the verticals 38, 40 are connected by a lateral support 42.

THE TIRE SUPPORTING MEMBERS

Figure 2:
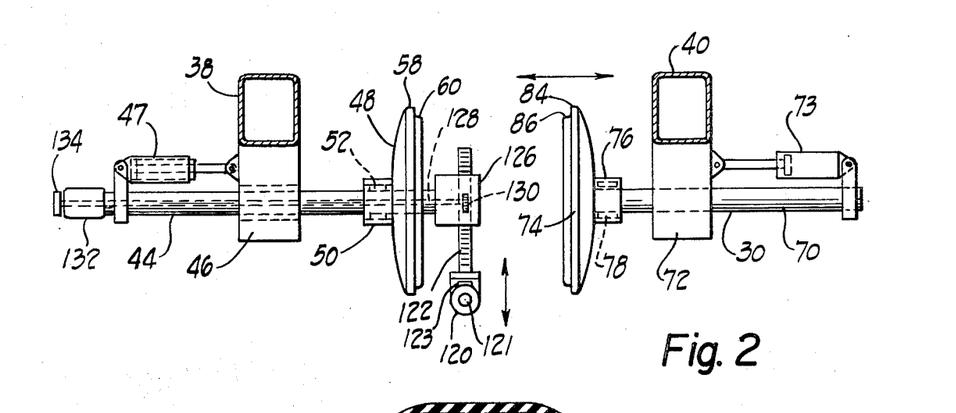
FIG. 2 is a schematic top plan view of a portion of the apparatus illustrated in FIG. 1 with parts shown in cross section.

When a tire moves into the inspection station, the tire supporting members move into engagement with the tire bead rims to support the tire for rotation about its axis at the inspection station. Referring now to FIG. 2, the tire engaging and support members 28, 30 are supported respectively by the verticals 38, 40 on opposite sides of the path of tire travel. The support member 28 includes a tubular cylindrical body 44 connected to the vertical 38 by a bearing arrangement 46 which allows the body 44 to slide horizontally relative to the vertical 38.

The tire supporting member 28 is movable between a retracted position and a tire engaging position at the path of travel by an actuator 47. The actuator 47, schematically shown, is connected between the body 44 and the vertical 38 for moving the body 44 horizontally through the bearing 46. The actuator 47, as illustrated in FIG. 2, is a ram and cylinder type actuator having a telescoping ram and which is preferably pneumatically operated.

A bead rim engaging hub 48 is connected to the body 44 at the end projecting toward the path of travel of the tire. The hub 48 includes a support collar 50 which projects from the hub and surrounds the end of the body 44.

Figure 5:
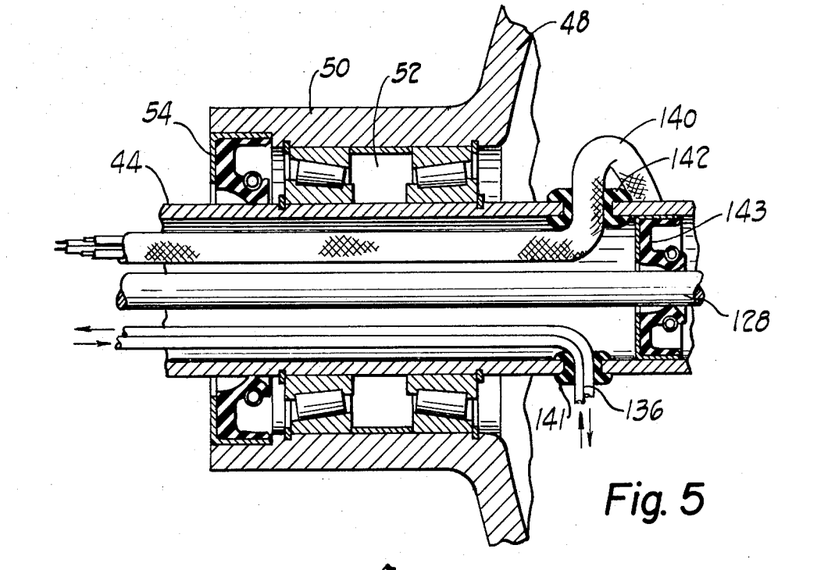
FIG. 5 is a cross sectional view of a portion of the apparatus of FIG. 4 as seen approximately from the plane indicated from the line 5—5 of FIG. 4.

A bearing assembly 52 is disposed between the support collar 50 and the body 44 to enable the hub 48 to rotate freely with respect to the body. As is shown in FIG. 5 the bearing assembly comprises a pair of roller type thrust bearings between the collar 50 and the body 44. A cartridge lip seal 54 is disposed between the collar 50 and the body 44 to prevent the passage of fluid between the collar 50 and the body 44.

The outer periphery of the hub 48 defines an annular bead rim sealing area which is comprised of a hub rim 58 and shoulder 60. The rim 58 and shoulder 60 are sized to engage the bead rim of the tire at the inspection station to establish a seal with the bead rim so that a tire engaged along the sealing area may be inflated without the escape of gas between the sealing area and the tire bead rim.

The tire supporting member 30 is defined by a tubular cylindrical body 70 which is slidably connected to the vertical 40 by a bearing 72. An actuator 73 (schematically shown in FIG. 2) moves the supporting member 30 horizontally relative to the vertical 40 between a retracted position and a tire engaging position. The actuator 73 is connected between the body 70 and the vertical 40 and is preferably pneumatically operated like the actuator 47.

The bead rim engaging hub member 74 is carried by the body 70 on an end of the body projecting toward the path of tire travel. The hub 74 defines a support collar 76 which extends about the body 70. A bearing assembly 78 is disposed between the collar 76 and the body 70 to enable the hub 74 to rotate freely relative to the body. A seal 80 is disposed between the collar 76 and the body 70 to prevent air from flowing between the collar 76 and the body 70 through the bearing assembly. The bearing assembly 78 and seal 80 are of the same construction as described above in reference to FIG. 5.

The outer periphery of the hub 74 defines an annular sealing area comprised of hub rim 84 and shoulder 86. The sealing area is configured to sealingly engage the bead rim of a tire at the inspection station.

When a tire has moved along the chute 12 to the inspection station, the support members 28, 30 are moved by the actuators 47, 73 from their retracted positions towards the path of tire travel so that the annular sealing areas of the hubs 48, 74, respectively, are sealingly engaged with the bead rims of the tire. At this juncture the tire is inflated so that the volume between the support members 28, 30 and the toroidal volume defined by the tire is filled with pressurized air.

THE TIRE INFLATING SYSTEM

Figure 6:
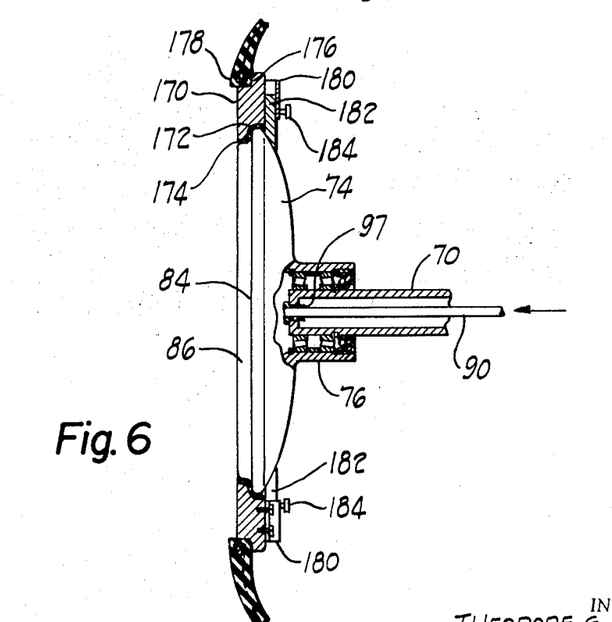
FIG. 6 shows a tire engaging member of the apparatus provided with a rim adapter, shown in cross section, for engaging the rim of a tire having a larger hub diameter than the diameter of the tire engaging member; and, FIG. 7 is a perspective view of a modification of the tire inspection system shown in FIG. 1.

As is best seen in FIGS. 1 and 6 the support member 30 carries an air hose 90 which extends to the center of the hub 74 and through which pressurized air is introduced into the tire. The hose 90 communicated with a pressurized air tank 92 through a control valve 94 and an air line 96 (FIG. 1). The hose 90 extends to the hub 74 through the tubular body 70. A seal 97 is disposed between the body 70 and the hose 90 to prevent air leakage from the tire along the hose. When the members 28, 30 engage the tire, the valve 94 is opened and air is introduced into the tire. The tire may be inflated to a pressure of as much as 40 pounds per square inch above the ambient atmospheric air pressure after which the valve 94 is reclosed. It has been found that adequate bead rim separation and tire support can be achieved by lower inflation pressures, e.g. 1.5–5 psi, since the tire is not under load when being inspected. Control of the operation of the valve can be accomplished by any suitable manner but preferably the valve is automatically opened in response to movement of the members 28, 30 to their tire inspecting positions and is closed in response to air pressure of a predetermined level in the tire.

As the tire is inflated, the hubs 48, 74 are moved slightly toward their retracted positions against the force of the actuators 47, 73 to enable separation of the tire bead rims and side walls under the pressure forces created by the air in the tire. The separation of the side walls and bead rims in this manner occurs uniformly about the tire and does not distort or damage the bead rims or side walls. When the tire bead rims are separated a predetermined amount the movement of the hubs 48, 74 toward their respective retracted positions is terminated.

After inspection, the supporting members 28, 30 are fully retracted to release the tire. The air in the tire escapes to the atmosphere when the supporting members retract.

THE TIRE DRIVING DEVICE

The inflated tire is freely rotatable about its axis with the rotatable hubs 48, 74 and is rotated about its axis by the tire driving device 34. The device 34 preferably comprises a rotatable drive member 98 which is frictionally engaged with the tire tread area. The member 98 is rotatably driven by an electric motor 100 and gear reduction 102.

The device 34 is mounted on a support 104 which is connected to the vertical 40. The support 104 is adjustably movable vertically along the vertical 40 by an actuator 106 connected between the vertical 40 and the support 104.

As a tire approaches the inspection station, the actuator 106 is operated to move the drive member 98 vertically upwardly from the path of travel so that the tire can freely move into the inspection station. The actuator then lowers the device 34 until the drive member frictionally engages the tire periphery. The actuator 106 enables the drive member 98 to frictionally engage a wide variety of different sized tires.

THE X-RAY SOURCE ASSEMBLY

When the tire is inflated the x-ray source assembly is actuated so that an x-ray beam produced by the assembly emanates from adjacent or within the torus of the tire and passes through the tire to the imaging system 18. The x-ray source assembly 16 is carried by the tire supporting member 28 and comprises an actuating assembly 118 connected to the supporting member 28 and an x-ray tube housing 120 connected to the assembly 118. A rotatable x-ray tube 121 is disposed in the tube housing 120.

The housing 120 is an L-shaped tubular member having one leg connected to the actuating assembly 118 and extending generally radially relative to the tire. The other leg of the housing 120 extends generally tangentially relative to the tire and contains the x-ray tube 121. The x-ray tube, shown schematically, produces a beam of x-rays which emanates from a focal spot defined by the tube and the tube is rotated in its housing leg about an axis which extends generally tangentially to a tire being inspected. Thus as the x-ray beam is rotated it sweeps through the surrounding tire wall from bead rim to bead rim.

The x-ray tube 121 is preferably rotated by a small reversible electric motor and associated gear train, shown schematically at 123, mounted on the x-ray tube housing 120. An x-ray tube housing, x-ray tube and tube drive arrangement of the type referred to is disclosed in detail in the cross referenced application to Palermo and reference should be made to that application for further details of the construction of these elements.

The actuating assembly 118 moves the tube housing radially relative to the tire between a retracted position in which the tube housing is inserted into the tire through one bead rim, and an extended inspection position in which the x-ray tube is disposed so that the focal spot is adjacent or in the torus of the tire. In its inspection position for most tires the radial distance between the x-ray tube focal spot and the axis of tire rotation is preferably at least as great as the radial distance between the sealing areas of the hubs 48, 74 and the axis of rotation. In some tires the bead rims can be spread substantial distances without damage to the tire occurring and in such instances the focal spot may be positioned adjacent but not within the torus of the tire.

The actuating assembly 118 comprises a support rack 122 to which the housing 120 is connected. The rack 122 has gear teeth 124 formed along one side and extends through a gear housing 126 connected to the projecting end of the body 44. The gear housing 126 is located between the hubs 48, 74.

Figure 4:
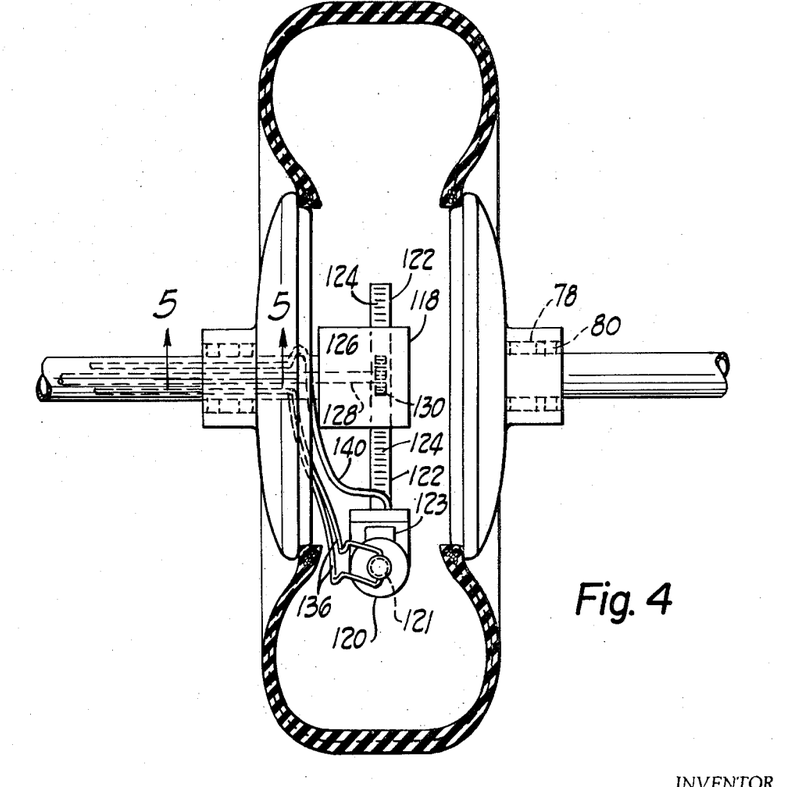
FIG. 4 is a fragmentary cross sectional view of a portion of the apparatus of FIG. 1 as seen approximately from the plane indicated by the line 4—4 in FIG. 1.

A rotatable drive shaft 128 extends through the body 44 and supports a pinion gear 130 in the gear housing 126 (FIG. 4). The pinion gear meshes with the rack teeth 124 so that when the pinion gear is rotated the rack 122 and x-ray tube housing 120 are moved radially relative to the hub 48. The drive shaft 128 preferably extends axially through the body 44 to its opposite end and is driven by a reversible motor 132 through a gear reduction 134. The motor 132 and gear reduction 134 are mounted on the body 44 at its opposite end (FIG. 1).

Coolant conduits 136 and a coaxial electric power cable 140 extend through the body 44 for connection to the x-ray tube housing 120. The coolant conduits carry cooling water to and from the x-ray tube and the power cable provides electrical power for the x-ray tube and the x-ray tube driving motor. The coolant conduits and power cable are flexible and sufficient slack is provided in them to enable movement of the x-ray tube housing 120 radially relative to the hub.

The interior of the body 44 is sealed off from tires at the inspection station so that air does not leak from inflated tires through the body 44. As is shown in FIG. 5 the coolant conduits 136 and power cable 140 extend from the body 44 through seals 141, 142, respectively, which prevent air flow into the body 44 from the inflated tire. A lip seal 143 is disposed between the shaft 128 and the body 44 to prevent leakage of air along the shaft 128 into the body 44.

When a tire moves into the inspection station between the tire engaging members 28, 30, the x-ray tube housing 120 is in its retracted position so that when the hub 48 advances into engagement with the bead rim of the tire the housing 120 and rack 122 move through the bead rim. As the tire is being inflated the motor 132 is operated to move the x-ray tube housing 120 radially from the axis of the hub 48 until the x-ray tube is positioned in the torus defined by the now inflated tire. As noted, inflation of the tire assures that the bead rims are separated sufficiently to provide clearance between the x-ray tube housing 120 and the bead rims.

THE IMAGING SYSTEM

The preferred and illustrated imaging system 18 is constructed to orbit about the x-ray tube housing 120 when in its inspection position so that the x-ray beam is aligned with the imaging system as the beam sweeps about the tire. The imaging system 18 preferably comprises an image intensifier unit known by the trademark "DELCALIX" and commercially available from De Oude Delft, a Dutch company. The unit 150 comprises a screen 152 which fluoresces visible light when x-rays impinge on it. The light thus produced provides an x-ray transparency image of the tire wall through which the x-ray beam has passed. This image is amplified and optically coupled to a television camera (not shown) in the unit. The output from the television camera is transmitted to the viewing monitor in the inspection booth.

The unit 150 is disposed on a bed 160 which is rotatably connected to the base 36 of the tire support assembly. The bed 160 is driven by a reversible motor 162 which rotates the bed about a vertical axis extending tangentially relative to the tire. The unit 150 is thus movable orbitally about the tube housing 120.

Operation of the x-ray tube driving motor and the bed driving motor 162 are synchronized so that the sweep of the x-ray beam is correlated with orbital movement of the imaging unit 150. The beam sweep can be continuous or can be accomplished in a stepwise manner as desired.

The unit 150 orbits about the tire and x-ray tube housing 120 through an angle of about 180°. When inspection is initiated, the unit 150 is disposed at one side of the tire and a beam of x-rays passing through the bead rim on that side is imaged. The unit 150 moves about the tire through its range of movement in synchronism with the sweep of the x-ray beam and inspection is concluded with imaging of the opposite bead rim. During the next succeeding inspection, the direction of travel of the unit 150 and the x-ray beam sweep is reversed.

Figure 3:
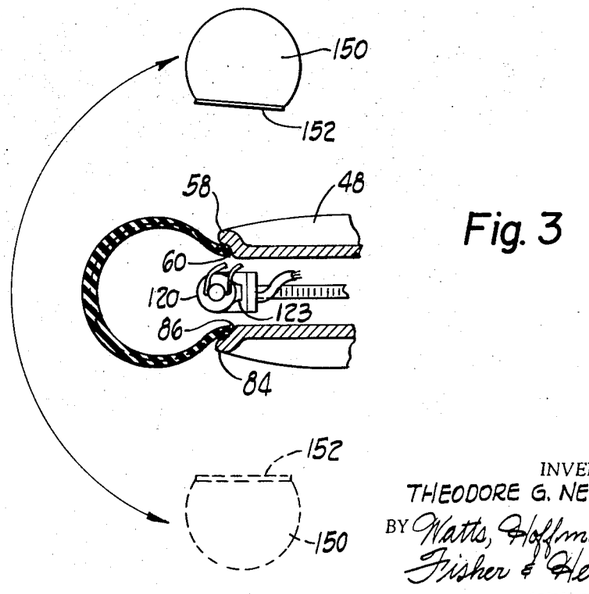
FIG. 3 is a top plan view of a portion of the apparatus illustrated in FIG. 1 with parts shown in cross section.

As is seen in FIG. 3, the x-ray beam may pass through the rims of the hubs 48, 74 when the bead rims of the tire are being inspected. At these extreme positions of the x-ray beam the electrical power supplied to the x-ray tube may be increased to enable clearer imaging of the bead rims if the material of the hubs prevents adequate imaging at a normal power level. The hubs or the rim portions of the hubs can be constructed from materials such as aluminum or certain plastics which are substantially transparent to x-rays.

Experiments have shown that the transparency images produced according to the invention are of unexpectedly high quality in that the images exhibit minimal effects from x-ray scattering. It is believed that the compressed air atmosphere in the tire is responsible for absorbing "soft" or scattered x-rays which would otherwise impinge on the screen 152 and tend to fog the image. It has also been found that subjecting the x-ray tube to cyclic external pressures does not adversely effect the operation or durability of the tube.

THE BEAD RIM ADAPTERS

Tires having various bead rim diameters are readily inspected by the new system. When tires being inspected have larger bead rim diameters than the diameters of the hubs 48, 74, annular rim adapters 170 are secured to the respective hubs. One such adapter 170 is illustrated in FIG. 6. The rim adapter 170 has an inner periphery 172 shaped to correspond to the sealing area of the associated hub. A resilient sealing gasket 174 is formed on the inner periphery 172 for providing an air tight seal between the sealing area of the hub and the rim adapter 170. The outer periphery of the rim adapter defines a projecting flange portion 176 and a shoulder 178 which sealingly engage with the tire bead rim.

In the illustrated embodiment, the rim adapter is latched to the associated hub. As shown in FIG. 6 the rim adapter carries a plurality of brackets 180 spaced about its circumference. Latch bolts 182 are slidably disposed in the brackets 180. The latch bolts have projecting wedge-shaped ends and are slid towards the hub to wedge the rim adapter into sealing engagement with the hub. Suitable knobs 184 are carried by the bolts to enable them to be slid between the latched and unlatched positions.

As has been noted previously the rim adapters 170 can be formed from materials which are substantially transparent to the tire penetrating radiation. It has been found that plastic material can be used for this purpose without breakage or deformation of the plastic material. This is due to the fact that the plastic rim adapters have relatively small annular areas across which differential pressure forces act when the tire is inflated and because the inflation forces tending to urge the tire bead rims into engagement with the rim adapters are partially balanced by internal stresses developed in the tire itself and are thus not borne solely by the rim adapters.

Figure 7:
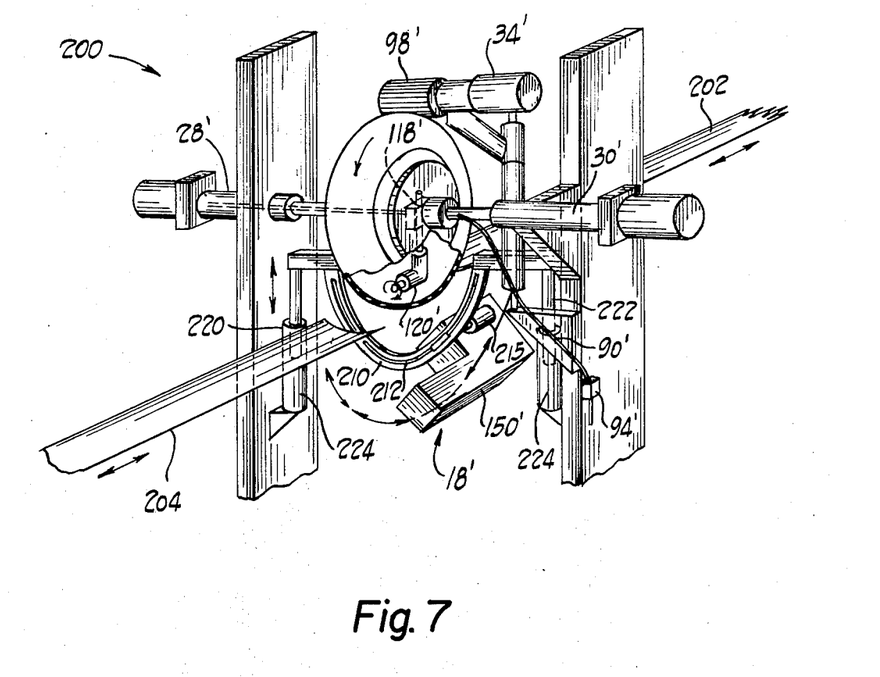

THE APPARATUS OF FIG. 7

An alternate tire inspection apparatus 200 is shown schematically in FIG. 7. Components of the modified apparatus which are substantially the same as those shown and described in reference to FIGS. 1–6 are indicated by corresponding primed reference numerals and are not further described.

The apparatus 200 comprises entrance and exit chutes 202, 204, respectively, along which tires are advanced through the inspection station. The tire drive device 34' is elevated to enable a tire to advance under it to the inspection station along the chute 202. The entrance chute 202 is movable parallel to the path of travel to deliver a tire to the inspection station. The tire engaging members 28', 30' thereupon engage the tire and the entrace chute 202 is retracted. A suitable chute actuator (not shown) advances and retracts the chute 202.

The tire is inflated while supported by the members 28', 30' and the tire drive 34' is lowered to engage the drive member 98' with the tire.

The x-ray tube housing 120' is moved to its inspection position in or adjacent the torus of the tire when the tire is inflated and the bead rims are spread apart. The x-ray tube housing is supported for vertical movement by the actuator assembly 118' in the modified apparatus so that the tube housing 120' is lowered to its inspection position. The x-ray beam produced by the x-ray tube 121' sweeps in a vertical plane about the tire wall. The relationship between the x-ray tube and the tire is otherwise the same as described in reference to FIGS. 1–6.

The imaging system 18' comprises an image intensification unit 150' which produces a video output for a remote T.V. monitor. The unit 150' is mounted on a semicircular support 210 having its center of curvature lying on a horizontal line coextending with the axis of the x-ray tube and in the vicinity of the x-ray tube when in its inspection position. The support 210 defines a semicircular way 212 in which the unit 150' is supported.

The unit 150' is orbitally moved about the tube housing 120' in synchronism with the sweep of the x-ray beam while the tire is rotated so that the tire is completely inspected. The unit slides along the way 212 in the support 210 to accomplish the orbital movement.

The unit 150' is driven along the support 210 by a reversible drive motor 215 which is connected to the unit 150'. The motor 215 preferably drives an output gear, not shown, which meshes with a ring gear on the support 210. When the motor 215 is driven in one direction the unit 150' traverses the support 210 in one direction and when the motor is reversed the unit 150' traverses the support in the opposite direction.

The support 210 may be supported in position by vertical supporting assemblies 220, 222 connected to opposite ends of the support 210. The vertical assemblies 220, 222 each include actuators schematically shown at 224 which permit the support 210 to be adjustably moved vertically relative to a tire at the inspection station.

When the tire has been inspected the exit chute 204 is moved to the inspection station and the tire engaging members are retracted to enable the tire to move from the inspection station on the exit chute. The tire drive device 34' is then raised and the exit chute is retracted to complete the inspection cycle.

While the invention is shown and described in reference to two preferred embodiments, the invention is not to be considered limited to the precise constructions disclosed. It is the intention to cover hereby all adaptations, modifications and uses of the invention coming within the spirit or scope of the claims.

What is claimed is:

1. A method of inspecting a tire defined by a tire wall forming a generally toroidal volume extending circumferentially about an axial tire centerline and comprising axially spaced side wall portions including bead rims and a tire tread area portion extending between the side wall portions, the method comprising:
    a. moving a tire to an inspection station;
    b. engaging axially opposite side wall portions of the tire and providing a sealing area about each of said side wall portions;
    c. inflating the tire while maintaining sealing engagement with the tire;
    d. positioning a source of penetrative radiation between the bead rims of the tire and at least adjacent the toroidal volume defined by the tire to direct penetrative radiation through the tire wall;
    e. relatively rotating the tire and said source about the centerline of the tire; and,
    f. detecting penetrative radiation which has passed from said source through said tire while inflated to provide inspection information concerning the construction of the tire.

2. A method as claimed in claim 1 including maintaining said source of penetrative radiation in a location axially between and radially inwardly of the tire bead rims while establishing engagement of said opposite side wall portions of the tire.

3. A method as claimed in claim 1 wherein inflating the tire comprises introducing pressurized air into the tire.

4. A method as claimed in claim 1 wherein engaging axially opposite side wall portions of the tire comprises sealingly engaging the bead rims of the tire and further including spreading the bead rims apart when the tire is inflated.

5. A method as claimed in claim 1 further including producing a beam of penetrative radiation from said source and sweeping said beam from one tire bead rim to the other tire bead rim whereby the tire wall is completely inspected.

6. A method as claimed in claim 5 wherein detecting penetrative radiation comprises positioning a radiation detection device outside of the tire and moving the detection device about the tire to maintain the detecting device substantially within the path of the beam during inspection of the tire.

7. A method as claimed in claim 1 wherein detecting penetrative radiation comprises producing a transparency image of the penetrative radiation which has passed through the tire wall.

8. A method as claimed in claim 1 wherein relatively rotating the tire source between the axial wall portions; the radiation source comprises rotating the tire about its centerline.

9. A method of inspecting tires comprising:
    a. moving a tire to an inspection station;
    b. engaging opposite axially spaced wall portions of the tire and providing a sealing area about each wall portion;
    c. inflating the tire while engaging the wall portions;
    e. spreading the wall portions axially apart while maintaining the tire inflated;
    e. positioning an x-ray soufce between the axial wall portions;
    f. directing x-rays through the tire wall from said x-ray source;
    g. rotating the tire about its axis relative to the x-ray source; and,
    h. detecting x-rays which pass through the tire to produce inspection information concerning the construction of the tire.

10. The method claimed in claim 9 wherein directing x-rays comprises forming a beam of x-rays and sweeping the x-ray beam about the tire in a plane passing through the tire wall portions, bead rims of the tire and the tread area of the tire.

11. The method claimed in claim 10 wherein detecting x-rays comprises stationing an x-ray detector means outside of said tire and moving said detector means about the tire in said plane in timed relation to the sweep of said beam.

12. The method claimed in claim 9 wherein inflating said tire comprises introducing pressurized air into the tire and further including absorbing soft x-rays with said pressurized air to reduce the quantity of soft x-rays detected.

13. The method claimed in claim 9 wherein positioning an x-ray source between the axial wall portions comprises relatively moving the tire and the x-ray source to positon a focal spot of the x-ray source within the toroidal volume defined by the tire.

14. Tire inspection apparatus comprising:
    a. first and second tire engaging means each comprising a tire engaging member defining a continuous sealing surface, said sealing surfaces each disposed about a common axis and spaced from each other along said axis;
    b. actuator means for moving at least one of said tire engaging members along said axis from a retracted position to a first tire engaging position wherein opposite sides of a tire are engageable by said sealing surfaces respectively;
    c. radiation source means comprising a device for producing penetrative radiation supported by one of said tire engaging means at a location axially between said tire engaging members;
d. second actuator means for adjustably moving said device radially relative to said axis to an inspection position wherein the radial distance between said device and said axis is at least as great as the radial distance between said sealing surfaces and said axis;
e. detection means for detecting radiation emanating from said source means; and,
f. inflation means for inflating a tire engaged by said first and second tire engaging means.

15. The apparatus claimed in claim 14 wherein said sealing surfaces are defined by rotatable hub members and are engageable with bead rims of a tire.

16. The apparatus claimed in claim 14 wherein said first mentioned actuator means effects movement of said at least one tire engaging member toward said retracted position from said first tire engaging position to a second tire engaging position wherein bead rims of a tire engaged by said sealing surfaces are spread apart by internal pressure forces in said tire.

17. The apparatus claimed in claim 14 wherein said detection means comprises a detecting member orbitally movable about said source means.

18. The apparatus claimed in claim 14 wherein said device for producing radiation comprises an x-ray tube which directs x-rays radially therefrom in a plane extending generally parallel to said axis.

19. The apparatus claimed in claim 18 wherein said x-ray tube emits a beam of x-rays which is swept about said inspection position in said plane.

20. The apparatus claimed in claim 19 wherein said detection means comprises an x-ray detector member and means for moving said detector orbitally about said inspection position.

21. The apparatus claimed in claim 14 wherein said inflation means comprises a source of pressurized gas and means for communicating said source of pressurized gas to one of said tire engaging means.

22. Tire inspection apparatus comprising:
a. first and second tire engaging means each comprising a tire engaging member defining a continuous annular sealing surface, said sealing surfaces each disposed about a common axis and spaced from each other along said axis;
b. means for positioning a tire for sealing engagement by said sealing surfaces respectively so that a sealed volume is defined within the tire between said tire engaging members;
c. radiation source means comprising:
1. an x-ray tube supported at a location axially between said tire engaging members; and,
2. actuator means connected between said x-ray tube and one of said members for adjustably moving said tube radially relative to said axis from a retracted position wherein said tube is disposed radially between said axis and said sealing surfaces to an inspection position wherein the radial distance between a part of said tube and said axis is at least the same as the radial distance between said sealing surfaces and said axis;
d. radiation detection means for detecting x-rays which emanate from said source means; and,
e. tire inflation means for communicating pressurized gas to a location between said tire engaging members.

23. Apparatus as claimed in claim 22 wherein said tire engaging members each comprise a rotatable hub member and said sealing surfaces are each defined by an annular member detachably connected to said hub member.

24. Apparatus as claimed in claim 22 wherein said tire engaging members each comprise a rotatable hub member and said seal sealing surfaces are defined by the peripheries of said hub members.

25. Apparatus as claimed in claim 22 wherein said x-ray tube produces a beam of x-rays which is swept about said inspection position in a plane substantially parallel to said axis.

26. Apparatus as claimed in claim 25 further including means for rotating a tire engaged by said tire engaging means about said axis relative to said radiation source means.

27. A tire inspection apparatus comprising:
a. first and second tire engaging means each comprising a member defining a continuous annular sealing surface for engaging with and sealing a bead rim of a tire whereby a sealed volume is defined between said tire engaging members within a tire engaged thereby;
b. inflation means for communicating pressurized gas to a location between said tire engaging members for inflating a tire engaged thereby;
c. source means for producing tire penetrating emanations, said source means disposed between said tire engaging members and located in the volume defined between said tire engaging members and within a tire supported thereby; and,
d. detection means for detecting emanations from said source means to produce inspection information concerning the tire.

28. Tire inspection apparatus as claimed in claim 27 further including actuator means for moving at least one of said tire engaging members toward the other tire engaging member to a tire engaging position, said actuator means effective to enable said at least one tire engaging member to move relatively away from said other tire engaging member to a tire inspection position in which bead rims of said tire are uniformly spread apart by the pressurized gas in said volume and are maintained in sealing engagement with said members.

29. In a method of inspecting an inflatable tire having a wall defining an annulus comprising bead rims, side wall portions and a tread portion which define a toroidal volume, the method comprising:
a. moving a tire to an inspection station;
b. supporting the tire at the inspection station;
c. introducing a fluid under pressure into the volume to inflate the tire during inspection;
d. providing a source means for directing tire penetrating emanations at least partially through the tire wall;
e. relatively rotating the tire and the source about a rotation axis extending along the tire centerline;
f. providing an emanation detecting means;
g. stationing one of said means at an inspection location axially between the bead rims and radially spaced from the rotation axis;
h. detecting emanations which penetrate the tire while inflated from the source means to provide inspection information concerning the construction of the tire.

30. A method as claimed in claim 29 further characterized in that inflating the tire comprises introducing pressurized air into the tire.

31. A method as claimed in claim 29 wherein supporting the tire is further characterized by sealingly engaging the bead rims of the tire and spreading the bead rims apart when the tire is inflated.

32. A method as claimed in claim 29 further characterized by producing a beam of penetrative radiation from said source means and sweeping said beam from one tire bead rim to the other tire bead rim whereby the tire wall is completely inspected.

33. A method as claimed in claim 29 wherein detecting emanations comprises producing a transparency image of tire wall portion through which the emanations have passed.

34. The method claimed in claim 29 wherein said source means comprises an x-ray tube and further comprising operating said x-ray tube to direct x-rays through the tire from the inspection location and detecting x-rays which have been passed through the tire from the x-ray tube.

35. The method claimed in claim 29 wherein emanations are directed from the source means to the detecting means throughout the tire wall from bead rim to bead rim.

36. A method of inspecting tires defined by a tire wall having a tire tread portion and connected side wall portions including bead rims, the tire wall defining a generally toroidal volume extending about an axial centerline, the method comprising:
   a. positioning an inflatable tire at an inspection station;
   b. engaging the tire to provide sealing areas;
   c. inflating the tire while maintaining sealing engagement with the tire;
   d. positioning a source of penetrative radiation axially between the tire bead rim locations and radially spaced from the tire tread portion to direct penetrative radiation through a circumferential section of the tire wall while the tire is inflated;
   e. relatively rotating the inflated tire and said source about the axial centerline of the tire; and,
   f. detecting penetrative radiation which has passed through said tire wall while inflated from said radiation source to provide inspection information concerning the construction of said tire.

37. A method as claimed in claim 36 wherein positioning the source of penetrative radiation comprises locating the source of penetrative radiation at least adjacent the toroidal volume within the circumference of the tire tread portion.

38. A method as claimed in claim 36 wherein penetrative radiation is directed from the source throughout the circumferential section of the tire wall from bead rim to bead rim.

39. Tire inspection apparatus comprising:
   a. first and second tire engaging means each comprising a tire engaging member defining a continuous sealing surface, said sealing surfaces each disposed about a common axis and spaced from each other along said axis;
   b. radiation source means comprising a device for producing penetrative radiation emanating from a focal spot;
   c. actuator means for adjustably moving said device radially relative to said tire engaging members to an inspection position wherein the focal spot is axially between said sealing surfaces and radially adjacent circumferential portions of said sealing surfaces;
   d. inflation means for inflating a tire engaged by said first and second tire engaging means; and,
   e. radiation detection means for detecting radiation passing through the wall of the inflated tire and providing inspection information concerning the construction of the tire.

40. In a method of inspecting an inflatable tire having a wall including a tread portion, side walls and bead rims, the wall defining a toroidal volume, the steps comprising:
   a. providing tire penetrating emanation emitting and detecting structures;
   b. locating at least part of one of said structures within the toroidal volume;
   c. relatively positioning the tire and the emitting and detecting structures so that source emanations may pass from the emitting structure into the tire wall and to the detecting structure;
   d. inflating the tire;
   e. passing emanations from the emitting structure into the tire wall; and,
   f. detecting emanations which emerge from the tire wall with the detecting structure while the tire is inflated to produce inspection information concerning the structure of the tire wall.

41. The method claimed in claim 40 wherein directing emanations from said emitting structure comprises directing the emanations through the tire wall from bead rim to bead rim.

42. The method claimed in claim 41 wherein directing emanations comprises forming a relatively narrow beam of tire penetrating radiation and sweeping the radiation beam about the tire wall from bead rim to bead rim.

43. Inspection apparatus for tires each comprising a wall defining an annulus having a tread portion, side wall portions and bead rims extending about the inner peripheries of the side wall portions, the apparatus comprising:
   a. first and second tire engaging means each comprising a tire engaging member defining a continuous annular sealing surface, said sealing surfaces each disposed about a common axis and spaced from each other along said axis;
   b. means for positioning a tire for sealing engagement by said sealing surfaces respectively so that a sealed volume is defined within the tire between said tire engaging members;
   c. radiation source means comprising:
      1. a radiation source element supported at a location axially between said tire engaging members; and,
      2. actuator means for adjustably moving said source element radially relative to said axis from a retracted position wherein said element is disposed radially between said axis and said sealing surfaces to an inspection position wherein the said element is moved relative to said axis radially away from said axis;
   d. tire inflation means for communicating pressurized gas to a location between said tire engaging members;

e. said tire engaging members comprising annular rim members each having a sealing surface which is configured to sealingly engage a bead rim of a tire being inspected, said annular rim members disposed about hub elements defined by said tire engaging means, and connecting means for detachably securing said rim members to said hub elements to enable removal and replacement of said rim members when tires having different sized bead rim diameters are inspected; and, f. radiation detection means for detecting radiation which has passed into the tire wall from said source means, said detection means effective to provide inspection information concerning the construction of the tire.

44. Apparatus as claimed in claim 43 wherein said rim members are substantially composed of a material which is substantially transparent to the tire penetrating radiation.

45. In a method of inspecting an inflatable tire having a wall defining an annulus comprising bead rims, side wall portions and a tread portion which define a toroidal volume, the method comprising:
   a. moving a tire to an inspection station;
   b. supporting the tire at the inspection station;
   c. sealingly engaging axial sides of the tire to provide a sealable volume defined at least in part by the tire;
   d. introducing a fluid under pressure into the volume to inflate the tire during inspection;
   e. providing a source of penetrative radiation for directing penetrative radiation through the tire wall;
   f. positioning the source of penetrative radiation relative to the tire at an inspection location axially between the bead rims and radially spaced from the rotation axis;
   g. relatively rotating the tire and the source of penetrative radiation about a rotation axis extending along the tire centerline;
   h. providing a radiation detecting means; and,
   i. detecting penetrative radiation which passes through the tire while inflated from the source of penetrative radiation to provide inspection information concerning the constructon of the tire.

46. In a method of inspecting an inflatable tire having a wall defining an annulus comprising bead rims, side wall portions and a tread portion which define a toroidal volume, the method comprising:
   a. moving a tire to an inspection station;
   b. supporting the tire at the inspection station;
   c. introducing a fluid under pressure into the volume to inflate the tire during inspection;
   d. providing a source of penetrative radiation for directing penetrative radiation through the tire wall;
   e. positioning the source of penetrative radiation at a location radially inward from the tire bead rims and axially spaced from the annulus defined by the tire wall as the tire moves to the inspection station;
   f. relatively moving said source of penetrative radiation and the tire when the tire is engaged at said inspection station so that said source of penetrative radiation extends into the annulus of the tire and is positioned at said inspection location relative to the tire when the tire is at said inspection station;
   g. relatively rotating the tire and the source of penetrative radiation about a rotation axis extending along the tire centerline;
   h. providing a radiation detecting means; and,
   i. detecting penetrative radiation which passes through the tire while inflated from the source of penetrative radiation to provide inspection information concerning the construction of the tire.

47. In a method of inspecting an inflatable tire having a wall including a tread portion, side walls and bead rims, the wall defining a toroidal volume, the steps comprising:
   a. providing penetrating radiation emitting and detecting structures;
   b. locating at least part of one of said structures within the toroidal volume;
   c. relatively positioning the tire and the emitting and detecting structures so that a beam may pass from the emitting structure through the wall to the detecting structure;
   d. inflating the tire;
   e. passing radiation from the emitting structure through the tire wall; and
   f. detecting radiation with the detecting structure which detected radiation has passed through the wall once while the tire is inflated to inspect the structure of the wall for defects.

48. The method claimed in claim 47 wherein locating at least part of one of said structures comprises locating at least part of said emitting structure within the toroidal volume.

* * * * *

UNITED STATES PATENT AND TRADEMARK OFFICE
CERTIFICATE OF CORRECTION

PATENT NO. : 3,801,786
DATED : April 2, 1974
INVENTOR(S) : Theodore G. Neuhaus

It is certified that error appears in the above-identified patent and that said Letters Patent are hereby corrected as shown below:

Column 3, line 7 "provide" should be --provided--.

Column 4, line 55, after "chute" insert --into the assembly 14. Tires are preferably fed along the chute--.

Claim 8: second line of claim, delete "source between the axial wall portions;" and insert --and--.

Claim 9: subparagraph (e) "sourfe" should be --source--.

Claim 13: line 4 of the claim, "positon" should be --position--.

Signed and Sealed this

Tenth Day of October 1978

[SEAL]

Attest:

RUTH C. MASON
Attesting Officer

DONALD W. BANNER
Commissioner of Patents and Trademarks